(12) United States Patent
Jung et al.

(10) Patent No.: US 6,689,841 B2
(45) Date of Patent: Feb. 10, 2004

(54) POLYPROPYLENE RESIN COMPOSITION

(75) Inventors: Soon-Joon Jung, Kyoungki-do (KR); Jae-Rim Choi, Daejon (KR); Bong-Hyun Park, Kyoungki-do (KR)

(73) Assignees: Hyundai Motor Company, Seoul (KR); LG Caltex Co., Ltd., Seoul (KR)

( * ) Notice: Subject to any disclaimer, the term of this patent is extended or adjusted under 35 U.S.C. 154(b) by 0 days.

(21) Appl. No.: 10/005,730

(22) Filed: Nov. 6, 2001

(65) Prior Publication Data

US 2002/0193489 A1 Dec. 19, 2002

(30) Foreign Application Priority Data

Mar. 8, 2001 (KR) ........................................ 2001-12075

(51) Int. Cl.$^7$ ............................................... C08L 23/00
(52) U.S. Cl. ........................ 525/240; 525/241; 525/88; 525/98; 525/99; 525/70; 525/451; 525/424; 525/426; 525/427; 525/445; 525/423
(58) Field of Search ................................. 525/260, 241, 525/88, 98, 99, 70, 78; 524/451, 424, 426, 427, 445, 423

(56) References Cited

U.S. PATENT DOCUMENTS

| | | | | |
|---|---|---|---|---|
| 5,283,267 A | * | 2/1994 | Nishio et al. ................ | 523/216 |
| 5,324,771 A | * | 6/1994 | Suehiro et al. .............. | 524/525 |
| 5,462,987 A | * | 10/1995 | Shinonaga et al. .......... | 524/451 |
| 5,629,371 A | * | 5/1997 | Kitagawa et al. ........... | 524/505 |
| 6,147,152 A | * | 11/2000 | Kanome et al. ............. | 524/451 |
| 6,441,081 B1 | * | 8/2002 | Sadatoshi et al. ........... | 524/451 |
| 2002/0013417 A1 | * | 1/2002 | Jung et al. .................. | 525/240 |
| 2002/0193489 A1 | * | 12/2002 | Jung et al. .................. | 524/423 |

* cited by examiner

*Primary Examiner*—David W. Wu
*Assistant Examiner*—Rip A Lee
(74) *Attorney, Agent, or Firm*—Christie, Parker & Hale, LLP

(57) ABSTRACT

The present invention relates to a polypropylene resin composition and more particularly, to the polypropylene resin composition comprising: (A) a propylene polymer comprising a propylene-ethylene copolymer having a certain limit viscosity alone and/or a propylene homopolymer having a certain pentad fraction (% mmmm); (B) an ethylene-α-olefin copolymer rubber comprising ethylene-propylene copolymer rubber and ethylene-α-olefin copolymer; (C) a styrene copolymer rubber; (D) a polypropylene modified with polar group-containing resin or a polyolefin polyol; and (E) an inorganic filler.

10 Claims, No Drawings

POLYPROPYLENE RESIN COMPOSITION

CROSS-REFERENCE TO RELATED APPLICATION

This application claims priority of Korea patent Application No. 2001-12078, filed on Mar. 8, 2001.

FIELD OF THE INVENTION

The present invention relates to a polypropylene resin composition and more particularly, to the polypropylene resin composition comprising: (A) a propylene polymer comprising a propylene-ethylene copolymer having a certain limit viscosity alone and/or a propylene homopolymer having a certain pentad fraction (% mmmm); (B) an ethylene-α-olefin copolymer rubber comprising ethylene-propylene copolymer rubber and ethylene-α-olefin copolymer; (C) a styrene copolymer rubber; (D) a polypropylene modified with polar group-containing resin or a polyolefin polyol; and (E) an inorganic filler. The polypropylene resin composition provides superior in rigidity, scratch resistance, gloss, adhesion to paint to the conventional polypropylene resin compositions and further provides excellent laser scoring characteristics and improved impact strength at a low temperature thus, being useful for interior automotive parts such as instrument panels, especially an instrument panel integrally enclosing an air bag.

BACKGROUND OF THE INVENTION

Polypropylene resins have been extensively used in exterior automotive parts including automotive bumpers and interior automotive parts including instrument panels and pillars, because they are excellent in flowability, impact strength, chemical resistance, and low-cost and have low specific gravity. However, in a case of interior automotive parts such as instrument panels, especially an instrument panel integrally enclosing air bag, an air bag is mounted within the instrument panel after the portion where the air bag is stowed is cut and then concealed that portion thus, resulting in vexatious complication and poor appearance. On the other hand, when an air bag is installed integrally within the instrument panel to remove such complications, there is a possibility of no opening of the air bag in an accident. Therefore, it is required to preweaken components overlaying an air bag enclosed within the instrument panel by scoring with the use of laser beam to be properly deployed in emergency. Accordingly, the instrument panel integrally overlying an air bag is expected to have excellent physical properties and adhesion to the paint and additionally stand laser scoring for the air bag to properly open in emergency. And further, it is required to exhibit excellent impact strength at a low temperature not to form broken pieces thereof when the air bag inflates.

There have been development of polypropylene resin compositions for interior automotive parts such as an instrument panel which provide good rigidity and physical properties and thus suitable for direct painting without a pretreatment but there is no development of polypropylene resin composition suitable for an instrument panel integrally enclosing an air bag. The inventors of the present invention have disclosed the polypropylene resin composition suitable for the instrument panel having excellent physical properties and adhesion to paint in U.S. patent application Ser. No. 09/749,698. However, the polypropylene resin composition disclosed in U.S. patent application Ser. No. 09/749,698 has excellent rigidity, physical properties and adhesion but it becomes dangerous for broken pieces formed with the inflation of an air bag due to lowered impact strength at a low temperature after post-treatment with laser beam.

Therefore, it is highly demanded to develop a polypropylene resin composition having excellent physical properties, adhesion to paints and additionally superior low-temperature impact strength required for an air bag deployment opening in an automotive industry.

SUMMARY OF THE INVENTION

An object of the present invention is to provide a polypropylene resin composition having excellent physical properties such as rigidity, scratch resistance, gloss, and adhesion to paints, laser scoring characteristics and highly reinforced low-temperature impact strength by comprising: a propylene polymer selected from the group consisting of a propylene-ethylene copolymer, and/or a propylene homopolymer; an ethylene α-olefin copolymer rubber comprising an ethylene-propylene copolymer rubber and ethylene-α-olefin copolymer; a styrene copolymer rubber, a polar group-containing resin, and an inorganic filler.

DETAILED DESCRIPTION OF THE INVENTION

The present invention is characterized by a polypropylene resin composition comprising;

(A) 30 to 70 wt. % of a propylene polymer comprising 0 to 30 wt. % of propylene homopolymer and 70 to 100 wt. % of propylene-ethylene copolymer;

(B) 10 to 30 wt. % of an ethylene α-olefin copolymer rubber comprising 60 to 95 wt. % of ethylene-propylene copolymer rubber and 5 to 40 wt. % of ethylene α-olefin copolymer;

(C) 1 to 10 wt. % of a styrene copolymer rubber comprising 10 to 50 wt. % of polymer blocks of styrene or its derivative, 50 to 90 wt. % of polymer blocks copolymerized with at least one selected from ethylene, isoprene, butylene, butadiene, and propylene;

(D) 1 to 7 wt. % of polar-group containing resin comprising a modified polypropylene grafted to 0.5 to 6.0 wt. % of graft ratio, a polyolefin polyol, or mixture thereof; and (E) 10 to 40 wt. % of an inorganic filler selected from the group consisting from talc, barium sulfate, potassium carbonate, and wollastonite.

The polypropylene resin composition of the present invention provides an interior automotive material suitable for an instrument panel integrally enclosing air bag with an injection molding. The instrument panel integrally enclosing an air bag with excellent laser scoring property and low-temperature impact strength is prepared from the molded article by coating without primer treatment and mounting an air bag.

Hereunder is given the detailed description of each component comprising the polypropylene resin composition of the present invention.

(A) Propylene Polymer

A propylene copolymer of the present invention is a crystalline polymer comprising a propylene-ethylene copolymer containing ethylenes and/or a propylene homopolymer.

Said propylene homopolymer has higher than 96% of pentad fraction (% mmmm) measured with $^{13}$C-NMR, preferably higher than 96.5%, and more preferably higher than 97%. If the pentad fraction is lower than 96%, the rigidity and heat resistance of the polypropylene resin composition become inferior. Also, the limit viscosity [η] of said propylene polymer of the present invention measured in 135° C. of decalin is in the range of 0.7 to 2.5 dl/g, preferably in the range of 0.85 to 2.2 dl/g, and more preferably in the range of 0.9 to 2.0 dl/g. If the limit viscosity [η] is lower than 0.7 dl/g, the impact strength of the formed polypropylene resin composition worsens, and if it exceeds 2.5 dl/g, the flowability becomes poor, so that the quality of the finally formed product worsens and the working condition becomes poor.

Said propylene-ethylene copolymer includes 3 to 20%, and preferably 5 to 15% of an ethylene content. The limit viscosity [η] of propylene-ethylene block copolymer of the present invention measured in 135° C. of decalin is in the range of 3.0 to 6.0 dl/g, preferably higher than 3.5 dl/g, and more preferably higher than 4.0 dl/g.

For a well-balanced properties of impact strength and fluidity, the composition of the propylene homopolymer and the propylene-ethylene copolymer is recommended to be in the range of 0 to 30:70 to 100 wt. %, and more preferably in the range of 0 to 20:80 to 100 wt. %. While the propylene homopolymer provides superior rigidity and heat resistance, it has poor impact strength. On the other hand, the propylene-ethylene copolymer provides improved impact strength, especially at a low temperature but it has poor formability, rigidity and heat resistance. Therefore, they can complement each other when mixed together.

The content of the propylene copolymer to the entire polypropylene resin is recommended to be in the range of 30 to 70 wt. %, more preferably in the range of 45 to 65 wt. %. If it is used more then 70 wt. %, the impact strength becomes impaired. On the other hand if it is used lower than 30 wt. %, the formability becomes poor.

(B) Ethylene-α-Olefin Copolymer Rubber

An ethylene-α-olefin copolymer rubber (B) of the present invention comprises an ethylene-propylene copolymer rubber and ethylene-α-olefin copolymer and is added to increase the impact strength by providing elasticity to the entire polypropylene resin composition.

The Mooney viscosity $[\eta]_{ML1+4}$ (125° C.) of the ethylene-propylene copolymer rubber (EPR) is in the range of 50 to 80 dl/g, preferably in the range of 55 to 70 dl/g. If the Mooney viscosity is higher than 80 dl/g, an appearance is inferior due to poor dispersion and the mechanical properties also become worsen. On the other hand, if it is less than 20 dl/g, the impact strength is lowered. The ethylene-propylene copolymer rubber (EPR) includes 20 to 80 wt. % of a propylene content, preferably 40 to 80 wt. %. If the content of propylene is lower than 20 wt. %, the impact strength worsens, and if it exceeds 80 wt. %, the rigidity worsens.

In particular, the ethylene-α-olefin copolymer of the present invention, is ethylene 1-butene (EBM) or ethylene 1-octene copolymer (EOM) and it is preferred to contain 12–45 wt. % of an α-olefin content. Said EBM having 12–45 wt. % of a butene content, preferably 15–20 wt. % and 0.5–10 g/10 min of a melt index, preferably 1–5 g/10 min, is preused. Said EOM having 15–45 wt. % of an octene content, preferably 25–35 wt. %, 1–50 dl/g of limit viscosity $[\eta]_{ML1+4}$ (121° C.), preferably 1.5-35 dl/g, and 0.86–0.91 g/cm³ of a density, preferably 0.87–0.90 g/cm³, is used.

Ethylene-propylene copolymer rubber (EPR) and ethylene α-olefin copolymer are mixed in the range of 60 to 95:40 to 20 wt. %, preferably in the range of 80 to 85:20 to 15 wt. % for the good of impact strength and rigidity balance. If ethylene-propylene copolymer rubber (EPR) is used solely, the rigidity worsens; and if α-olefin copolymer is used solely, the impact resistance worsens.

The content of ethylene-α-olefin copolymer rubber to the entire polypropylene polymer is recommended to be in the range of 10 to 30 wt. %, preferably in the range of 15 to 25 wt. %. If the said content is below 10 wt. %, the rigidity and formability worsen; and if it exceeds 30 wt. %, the impact strength worsens.

(C) Styrene Copolymer Rubber

A styrene copolymer rubber of the present invention comprises a polymer block of styrene or its derivate; and a polymer block of at least one selected from ethylene, isoprene, butadiene, and propylene to improve the impact strength without reducing the rigidity.

The copolymer rubber used in the present invention has higher than 97% of unsaturated bonds and an "a-b-a" linear type or non-linear type, wherein "a" block is formed from styrene or its derivative, "b" block is formed from at least one selected from ethylene, isoprene, butadiene, and propylene. "a" Block is used to enhance rigidity, gloss, tensile strength and hardness of the resin composition and "b" block is used to improve compatibility with the olefin resin composition. "a" Block is used in the range of 10 to 50 wt. %. If a content of "a" block is less than 10 wt. %, the rigidity and hardness are inferior. On the other hand, if it is more than 50 wt. %, the compatibility to olefin resin composition becomes poor, resulting in poor impact strength.

A content of styrene copolymer rubber to the entire polypropylene polymer is recommended to be in the range of 1 to 10 wt. %, preferably in the range of 1.5 to 7 wt. %. If the said content is higher than 10 wt. %, the gloss worsen; and if it is less than 1 wt. %, the elongation, etc is impaired.

(D) Polar Group-Containing Resin

A polar group-containing resin used in the present invention is a modified polypropylene, a polyolefin polyol, or a mixture thereof.

The modified polypropylene is a polypropylene copolymer grafted with dimethylol-p-octylphenol, an unsaturated carbonic acid or a derivative thereof, wherein examples of the unsaturated carbonic acid include maleic acid, acrylic acid, methacrylic acid, anhydrous maleic acid, and mixtures thereof. Here, a graft ratio is recommended to be 0.5 wt. % or higher, preferably 1.5wt. % or higher. If the graft ratio is lower than 0.5wt. %, it can be scraped by external impact due to poor adhesion to paint.

The polyolefin polyol of the present invention has polar hydroxyl (—OH) groups bonded at both ends of the saturated carbohydrate backbone having 150 to 200 carbon atoms. The polyolefin polyol is a low-molecular polymer with 10 to 16 poise (100° C.) of viscosity, 20 to 80 KOH mg/g of hydroxyl value. If the hydroxyl value of polyolefin polyol is lower than 20 KOH mg/g, the adhesion to paint becomes impaired. Otherwise if it exceeds 80 KOH mg/g, the adhesion to paint improves but the rigidity and impact strength worsen.

The modified polypropylene and polyolefin polyol according to the present invention can be used solely or mixed together. When used solely, the modified polypropylene is recommended to be in the range of 1 to 10 wt. %, preferably in the range of 1 to 5 wt. % to the entire polypropylene composition; and the polyolefin polyol is recommended to be in the range of 1 to 5 wt. %, preferably in the range of 1 to 3 wt. % to the entire polypropylene composition. When the two components are mixed together, the content of the mixed resin is recommended to be in the range of 1 to 7 wt. % to the entire polypropylene resin composition. If the content exceeds 7 wt. %, the impact property and rigidity may worsen.

(E) Inorganic Filler

An inorganic filler having an average particle size of 0.5 to 7 μm of the present invention is selected from the group consisting of talc, barium sulfate, calcium carbonate and wollastonite. Especially, talc with smaller average particle size than 7 μm is preferable in view of dispersion and other properties.

This inorganic filler is added in the range of 10 to 40 wt. % to the entire polypropylene resin. If the content is lower than 10 wt. %, the rigidity and heat resistance worsen, and if it exceeds 40 wt. %, the impact strength worsens.

Other additives, used by one having ordinary skill in the art, such as an anti-oxidant, a neutralizer, an anti-static agent, and a nucleating agent may be arbitrarily incorporated in an appropriate content not to obstruct the above-mentioned object of the present invention. Examples of the anti-oxidant are phenols, phosphates, and thiodipropionate synergists and examples of the neutralizer are calcium stearate and zinc oxide.

The polypropylene resin composition comprises the components (A) to (E) in the respective prescribed amount and if desired, an additional additive has a melt index of 3 to 40 g/10 min. When it is lower than 3 g/10 min, processability may be degraded and the flow mark of the product may occur. On the other hand, when it is higher than 40 g/10 min, the physical properties such as strength, rigidity, and impact strength become poor.

The method for preparing the polypropylene resin composition of the present invention is not limited to any special method. For example, components (A), (B), (C), (D), and (E) of the polypropylene resin composition according to the present invention can be prepared by a conventional mechanical mixing method. To be specific, general melt mixing machines such as Bambury mixer, single-screw extruder, twin-screw extruder and multi-screw extruder can be employed. Here, the mixing temperature is recommended to be in the range of 170 to 240° C.

The resin composition of the present invention can be subjected to the production by any of various molding techniques including extrusion, blow molding, injection molding, and sheet molding. Of these molding techniques, injection molding is preferably used.

The formed interior automotive parts prepared from the polypropylene resin composition of the present invention can be directly painted using modified acryl paint or urethane paint without the pretreatment. And then it is scored using the laser beam around an air bag. Since a particular infrared frequency (943 cm$^{-1}$) is used to have an even thickness after scoring, the resin composition has a high penetration to the used infrared frequency. If the penetration is low, it becomes impossible to control the thickness, resulting in uneven thickness, no opening of the air bag, and the formation of broken pieces if it is opened. Therefore, the test for proper opening of the air bag is performed.

Hereunder is given a more detailed description of the present invention using examples. However, it should not be construed as limiting the scope of this invention.

EXAMPLE AND COMPARATIVE EXAMPLE

The polypropylene resin composition comprising polypropylene resin (A), (B), (C), (D) and (E) with the amount listed in tables 1–5 was mixed with the mixing ratio listed in table 6 by means of Henschel mixer (trade name). The resulting mixture was melt-kneaded with twin-screw extruder having a diameter of 45 mm Φ and then pelletized.

(A) Propylene Copolymer

Physical properties of the used propylene copolymer are summarized in Table 1. The isotatic pentad fraction of the propylene homopolymer measured with $^{13}$C NMR was 96.8% mmmm and intrinsic viscosities of the propylene homopolymer and ethylene-propylene copolymer were determined in 135° C. of decalin. Limit viscosity of the solution was measured with Ubbeholde viscometer.

TABLE 1

| Category | | MI[1] (g/10 min) | Intrinsic viscosity ([η], dl/g) | $E_c$[2] (wt. %) | $R_c$[3] (wt. %) | $E_p$[4] ([η], dl/g) |
|---|---|---|---|---|---|---|
| Propylene homopolymer | PP-1[5] | 8 | 1.9 | — | — | — |
| | PP-2[5] | 14.5 | 1.3 | — | — | — |
| Propylene-ethylene copolymer | PP-3[5] | 60 | — | 60 | 15 | 4.3 |
| | PP-4[5] | 10 | — | 41 | 11 | 4.7 |

[1]MI: Melt index measured with ASTM D1238 (230° C./2.16 kg)
[2]$E_c$: Ethylene Content determined with FT-IR
[3]$R_c$: Xylene Extract Content
[4]$E_p$: Limit Viscosity
[5]PP-1, PP-2, PP-3, PP-4: Products manufactured from LG-Caltex Oil Corporation (B) Ethylene-Propylene Copolymer Rubber Physical properties of the used ethylene-propylene copolymer rubber and ethylene-α-olefin copolymer are summarized in Table 2.

TABLE 2

| Category | | Mooney viscosity[1] ($ML_{1+4}$, 50 dl/g) | $C_c$[2] (wt. %) |
|---|---|---|---|
| Ethylene-propylene copolymer | EPR-1[3] | 65 | 53.5 |
| | EPR-2[4] | 42 | 68 |
| | EPR-3[3] | 13 | 69 |
| Ethylene-α-olefin copolymer | EOM-1[5] | 23 | 24 |
| | EOM-2[5] | 8 | 24 |

[1]Mooney viscosity is measured with ASTM D1646
[2]$C_c$: a comonomer content determined with FT-IR
[3]EPR-1 & DPR-3 are manufactured from Kumho EP Co., Ltd.
[4]EPR-2 is manufactured from Misui Chemical Co.
[5]EOM-1 & EOM-2 are manufactured from Dow-Dupont Chemical Co.

(C) Styrene Copolymer Rubber

Physical properties of the used styrene copolymer rubber are summarized in Table 3.

TABLE 3

| Category | Type of copolymer | Content of styrene (wt. %) | Structure of polymer chain |
|---|---|---|---|
| St-1 | Ethylene-butyrene | 13 | Linear |
| St-2 | butadiene | 31 | Linear |

1) St-1 & St-2: products manufactured from Shell (D) Polar Group-Containing Resin Physical properties of the used polar group-containing resin are summarized in Table 4.

TABLE 4

| Category | $F_c$[1] (wt. %) | Hydroxy value (KOH mg/g) | Type of polar group |
|---|---|---|---|
| MPP[2] | 1.5 | — | –COOH |
| Polyol | — | 45 | –OH |

[1]$F_c$: A content of polar group
[2]MMP: Maleic anhydride modified polypropylene manufactured from LG-Caltex Oil Corporation
3) Polyol: Polytail-H manufactured from Misui Chemical Co.

(E) Inorganic Filler

Physical properties of the used inorganic filler are summarized in Table 5.

TABLE 5

| Category | Average particle size[3] ($\mu$m) |
|---|---|
| T-1[1] | 2.9 |
| T-2[2] | 7.6 |

[1]T-1: Talc manufactured from KOCH Co.
[2]T-2: talc manufactured from KOCH Co.
[3]Average particle size is measured with laser sedimentation method

TABLE 6

| | | Example | | | | Comparative Example | | | |
|---|---|---|---|---|---|---|---|---|---|
| Content (wt. %) | | 1 | 2 | 3 | 4 | 1 | 2 | 3 | 4 |
| (A) | PP-1 | 5 | 0 | 10 | 0 | 5 | 5 | 5 | 0 |
| | PP-2 | 0 | 10 | 0 | 0 | 0 | 0 | 0 | 0 |
| | PP-3 | 0 | 0 | 0 | 10 | 0 | 0 | 0 | 0 |
| | PP-4 | 53 | 40 | 40 | 50 | 55 | 49 | 40 | 15 |
| (B) | EPR-1 | 5 | 19 | 13 | 13 | 0 | 0 | 17 | 12 |
| | EPR-2 | 5 | 0 | 0 | 0 | 10 | 15 | 0 | 0 |
| | EPR-3 | 0 | 0 | 0 | 0 | 5 | 0 | 0 | 0 |
| | EOM-1 | 7 | 5 | 0 | 2 | 0 | 0 | 0 | 0 |
| | EOM-2 | 0 | 0 | 10 | 0 | 0 | 5 | 3 | 10 |
| (C) | St-1 | 3 | 3 | 0 | 3 | 3 | 3 | 12 | 3 |
| | St-2 | 0 | 0 | 5 | 3 | 0 | 0 | 0 | 0 |
| (D) | MPP | 0 | 3 | 0 | 0 | 0 | 0 | 3 | 0 |
| | Polyol | 2 | 0 | 2 | 2 | 2 | 3 | 0 | 0 |
| (E) | T-1 | 20 | 20 | 20 | 17 | 20 | 0 | 20 | 20 |
| | T-2 | 0 | 0 | 0 | 0 | 0 | 20 | 0 | 0 |

Testing Example
Test of Physical Properties

Physical properties of the polypropylene resin composition prepared from Examples 1–4 and Comparative Examples 1–4 were tested by the following method. The result is shown in Table 7.

[Test Method]
A. Melt index (MI, g/10 min): Tested with ASTM D1238 (230° C./2.16 kg)
B. Izod impact resistance (kg·cm/cm$^2$): Tested with ASTM D256 at 23° C. and at −30° C.
C. Modulus of bending elasticity (kg/cm$^2$): Tested with ASTM D790
D. Rockwell hardness: Tested with ASTM D785
E. Gloss: Tested with ASTM D523 using Saze/Gloss meter of BYK-Gardner
F. Scratch resistance: Tested with ASTM D3363
G. Adhesion to paint: The injection molded specimen was coated with modified acryl paint or urethane paint and dried at 80° C. for 30 min and further left at room temperature for more than 48 hrs. The coating on the specimen a was cut at an interval of 2 mm in longitudinal and transverse directions. Thus, a checkered pattern of 10×10(=100) squares was formed on the coated layer surface, and a cellophane adhesive tape was firmly adhered to each checker pattern under a finger pressure. Thereafter, the pressure-sensitive adhesive tape was abruptly released. The remaining checker patters was determined and the result thereof is summarized in Table 7.

TABLE 7

| Score | Remark |
|---|---|
| 10 | The coating film was not peeled at all |
| 8 | The coating film was little peeled which is less than 5% to the area of a regular tetragon. |
| 6 | The coating film was peeled about 5–15% to the area of a regular tetragon. |
| 4 | The coating film was peeled about 15–35% to the area of a regular tetragon. |
| 2 | The coating film was peeled about 35–65% to the area of a regular tetragon. |
| 0 | The coating film was peeled more than 65% to the area of a regular tetragon. |

F. Laser scoring: The surface of the sample was treated with laser beam mined whether an absorbance at 943 cm$^{-1}$ through 0.1 mm of thickness or not (⊚ for detectable and X for undetectable).

G. Air bag deployment opening: Specimen for the air bag deployment opening test is prepared under the condition shown in Table 8.

TABLE 8

| Category | Heat aging[1] | Life cycle[2] | Virgin[3] |
|---|---|---|---|
| −30° C. | 3 | 3 | 3 |
| 21° C. | 2 | 2 | 2 |
| 85° C. | 3 | 3 | 3 |

[1]Heat aging: left at 107° C. for 240 hrs, 21° C. for 8 hrs and at the above temperatures for 4 hrs
[2]Life cycle: left at a temperature of from 85 to −30° C. for 14 days and then 21° C. for 8 hrs
[3]Virgin: left 21° C. for 8 hrs
*Criterion for judging: depending on the formation of broken pieces under the three conditions when the air bag opens by indicating ⊚ for no formation and X for formation.

TABLE 9

| | | Example | | | | Comparative Example | | | |
|---|---|---|---|---|---|---|---|---|---|
| Content (wt. %) | | 1 | 2 | 3 | 4 | 1 | 2 | 3 | 4 |
| (A) | PP-1 | 5 | 0 | 10 | 0 | 5 | 5 | 5 | 0 |
| | PP-2 | 0 | 10 | 0 | 0 | 0 | 0 | 0 | 0 |
| | PP-3 | 0 | 0 | 0 | 10 | 0 | 0 | 0 | 0 |
| | PP-4 | 53 | 40 | 40 | 50 | 55 | 49 | 40 | 15 |
| (B) | EPR-1 | 5 | 19 | 13 | 13 | 0 | 0 | 17 | 12 |
| | EPR-2 | 5 | 0 | 0 | 0 | 10 | 15 | 0 | 0 |
| | EPR-3 | 0 | 0 | 0 | 0 | 5 | 0 | 0 | 0 |
| | EOM-1 | 7 | 5 | 0 | 2 | 0 | 0 | 0 | 0 |
| | EOM-2 | 0 | 0 | 10 | 0 | 0 | 5 | 3 | 10 |
| (C) | St-1 | 3 | 3 | 0 | 3 | 3 | 3 | 12 | 3 |

TABLE 9-continued

| Content (wt. %) | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| | St-2 | 0 | 0 | 5 | 3 | 0 | 0 | 0 | 0 |
| (D) | MPP | 0 | 3 | 0 | 0 | 0 | 0 | 3 | 0 |
| | Polyol | 2 | 0 | 2 | 2 | 2 | 3 | 0 | 0 |
| (E) | T-1 | 20 | 20 | 20 | 17 | 20 | 0 | 20 | 20 |
| | T-2 | 0 | 0 | 0 | 0 | 0 | 20 | 0 | 0 |
| MI (g/10 min) | | 6.1 | 6.0 | 7.3 | 5.6 | 7.3 | 7.6 | 7.3 | 7.8 |
| Izod impact resistance | 23° C. | 42 | 45 | 42 | 45 | 38 | 35 | 46 | 45 |
| | −30° C. | 6.5 | 7.0 | 6.8 | 7.1 | 4.8 | 4.3 | 7.4 | 6.5 |
| Modulus of bending elasticity | | 21000 | 21600 | 21000 | 20000 | 21000 | 20000 | 21000 | 20000 |
| Rockwell hardness | | 61 | 65 | 65 | 50 | 70 | 60 | 60 | 50 |
| Gloss | | 23 | 24 | 28 | 25 | 26 | 31 | 33 | 24 |
| Scratch resistance | | 4B | 3B | 3B | 4B | 4B | 4B | 4B | 5B |
| Coating adhesion* | | 10/10 | 10/10 | 10/10 | 10/10 | 10/10 | 10/10 | 10/10 | 2/10 |
| Laser scoring property | | ◉ | ◉ | ◉ | ◉ | ◉ | ◉ | X | ◉ |
| Air bag deployment opening | | ◉ | ◉ | ◉ | ◉ | X | X | X | ◉ |

*Coating adhesion: modified acryl/urethane paint

As shown in Table 9, the resin composition of Examples 1–4 provided excellent impact strength, hardness, coating adhesion which does not require any pretreatment, laser scoring property and air bag deployment opening. However, when the ethylene-propylene rubber having low viscosity was used alone in Comparative Examples 1, it was dangerous for the broken pieces formed with the air bag opening. Further, the impact strength is impaired with use of talc having a large average particle size in Comparative Example 2. The physical properties and laser scoring properties were reduced which resulted in poor impact strength during the air bag deployment opening with use of large amount of styrene copolymer rubber in Comparative Example 3. The coating adhesion was inferior when the polar group-containing resin was not used or used little.

As described above, the polypropylene resin composition of the present invention provides a well-balanced combination of the properties such as rigidity and impact strength, and excellent laser scoring property and is capable of painting directly without the pretreatment to be suitable for interior automotive parts, especially an instrument panel integrally enclosing an air bag.

What is claimed is:

1. A polypropylene resin composition comprising the following components (A), (B), (C), (D), and (E):
   (A) 30 to 70 wt. % of a propylene polymer comprising 0 to 30 wt. % of a propylene homopolymer and 70 to 100 wt. % of a propylene-ethylene copolymer;
   (B) 10 to 30 wt. % of an ethylene α-olefin copolymer rubber comprising 60 to 95 wt. % of an ethylene-propylene copolymer rubber and 5 to 40 wt. % of an ethylene α-olefin copolymer;
   (C) 1 to 10 wt. % of a styrene-based copolymer rubber comprising 10 to 50 wt. % of a polymer block of styrene or its derivative, 50 to 90 wt. % of a polymer block of at least one selected from the group consisting of ethylene, isoprene, butylene, butadiene, and propylene;
   (D) 1 to 7wt. % of a polar-group containing resin comprising a modified polypropylene grafted to a graft ratio of 0.5 to 6.0 wt. % a polyolefin polyol, or a mixture thereof; and
   (E) 10 to 40 wt. % of an inorganic filler selected from the group consisting from talc, barium sulfate, potassium carbonate, and wollastonite.

2. The polypropylene resin composition according to claim 1, wherein said propylene homopolymer has a pentad fraction (% mmmm) higher than 96% measured with $^{13}$C NMR and a limit viscosity of 0.7–2.5 dl/g and further wherein said propylene-ethylene copolymer has a limit viscosity of 0.7–2.5 dl/g and an ethylene content of 3–20 wt. %.

3. The polypropylene resin composition according to claim 1, wherein said ethylene-propylene copolymer rubber has a Mooney viscosity $[\eta]_{ML1+4}$ (125° C.) of 50–80 dl/g and a propylene content of 20–80 wt. %.

4. The polypropylene resin composition according to claim 1, wherein said ethylene-α-olefin copolymer has a melt index of 0.5–10 g/10 min and an α-olefin content of 12–45 wt. %.

5. The polypropylene resin composition according to claim 1, wherein said styrene copolymer rubber is linear or nonlinear and has more than 97% of unsaturated bonds.

6. The polypropylene resin composition according to claim 1, wherein said modified polypropylene is a polypropylene grafted with dimethylol-p-octylphenol, an unsaturated carbonic acid or a derivative thereof where the unsaturated carbonic acid is selected from the group consisting of maleic acid, acrylic acid, methacrylic acid, maleic anhydride and mixtures thereof.

7. The polypropylene resin composition according to claim 1, wherein said polyolefin polyol has polar hydroxyl (—OH) groups bonded at both ends of the saturated hydrocarbon backbone having 150 to 200 carbon atoms, a viscosity of 10 to 16 poise (100° C.) and a hydroxyl value of 20 to 80 KOH mg/g.

8. The polypropylene resin composition according to claim 1, wherein said inorganic filler has an average particle size of 0.5 to 7 µm.

9. The polypropylene resin composition according to claim 1, wherein the melt index of the entire composition is in the range of 3–40 g/10 min.

10. An interior automotive article which is molded from the polypropylene resin composition of claim 1 by an injection molding.

* * * * *